Nov. 29, 1966      G. R. PRICE      3,288,276

SAFETY DEVICE FOR TYPESETTING MACHINES

Filed Sept. 30, 1963      7 Sheets-Sheet 1

George R. Price
INVENTOR.

Nov. 29, 1966     G. R. PRICE     3,288,276
SAFETY DEVICE FOR TYPESETTING MACHINES
Filed Sept. 30, 1963     7 Sheets-Sheet 2

George R. Price
INVENTOR.

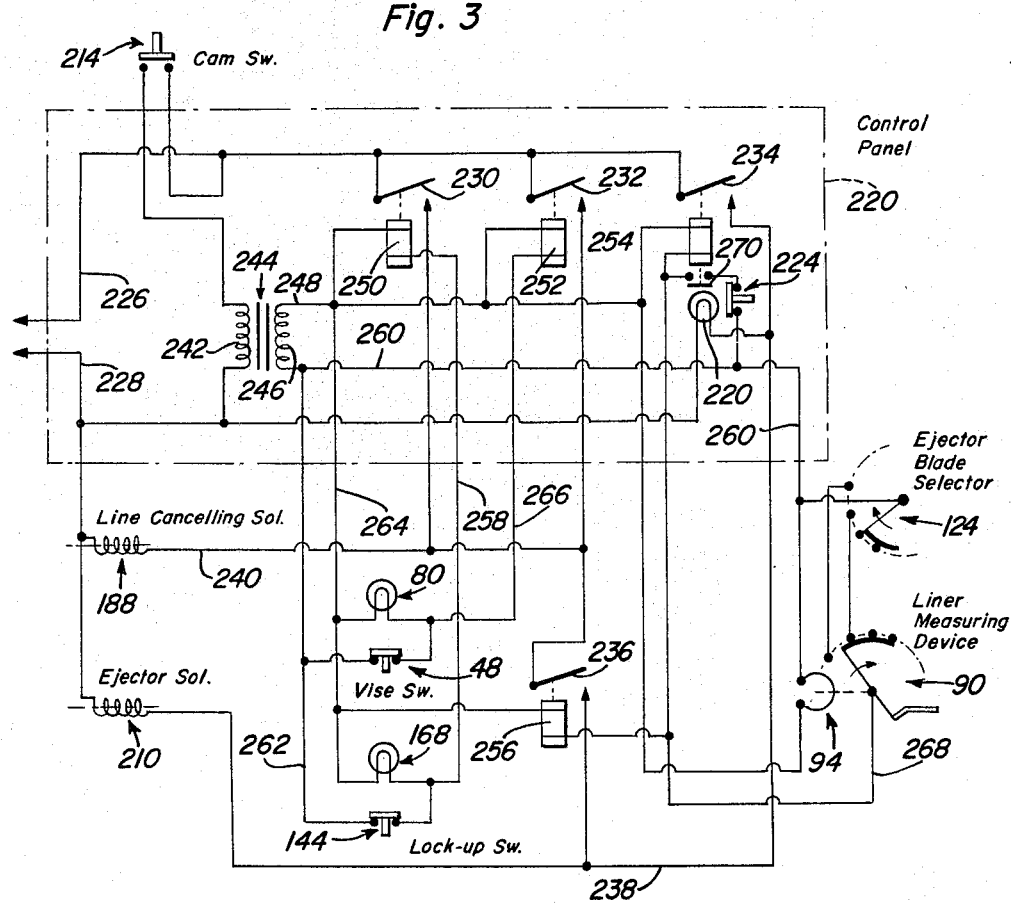
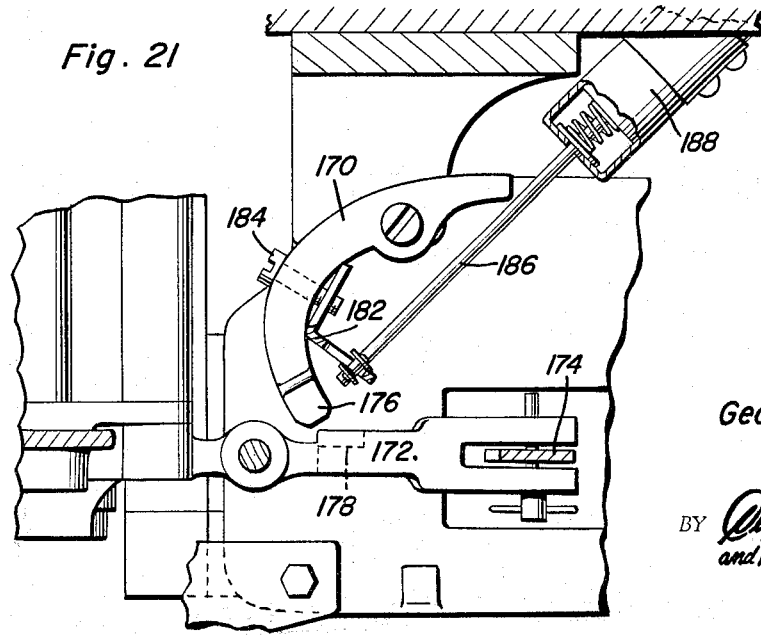

Nov. 29, 1966   G. R. PRICE   3,288,276
SAFETY DEVICE FOR TYPESETTING MACHINES
Filed Sept. 30, 1963   7 Sheets-Sheet 4
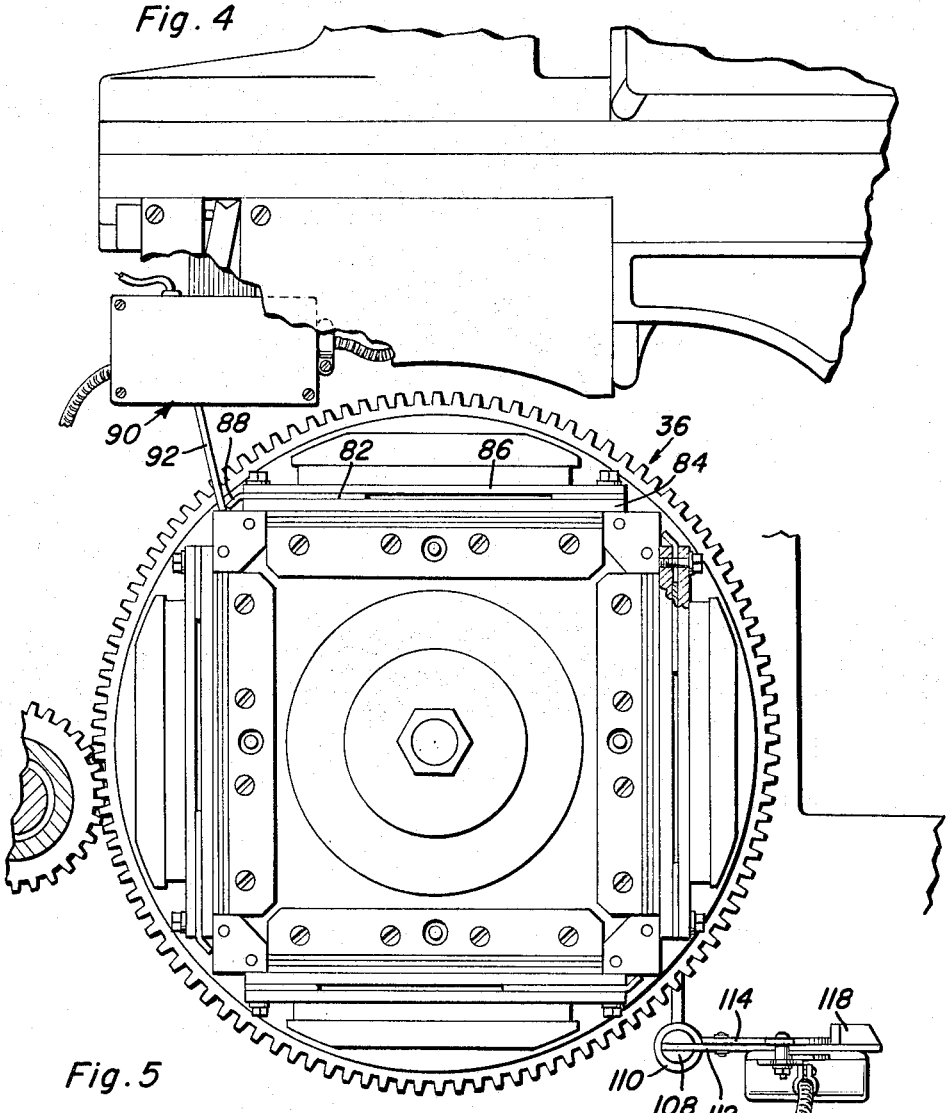
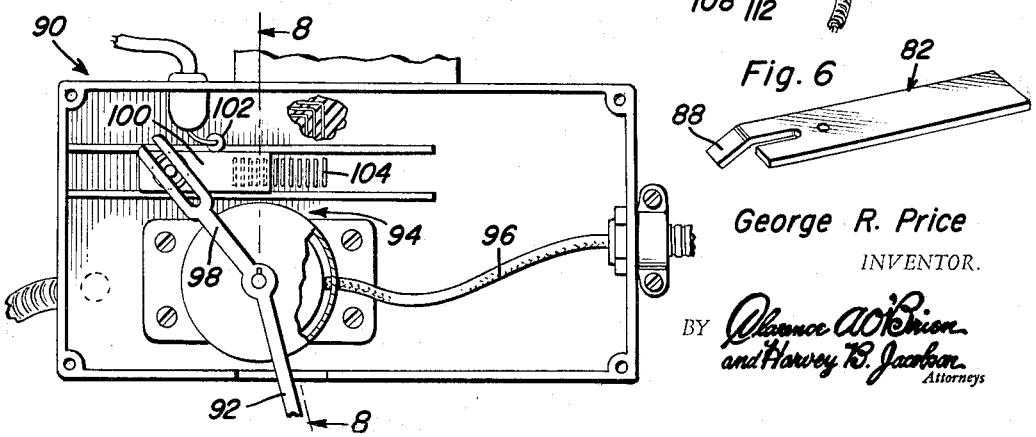
George R. Price
INVENTOR.

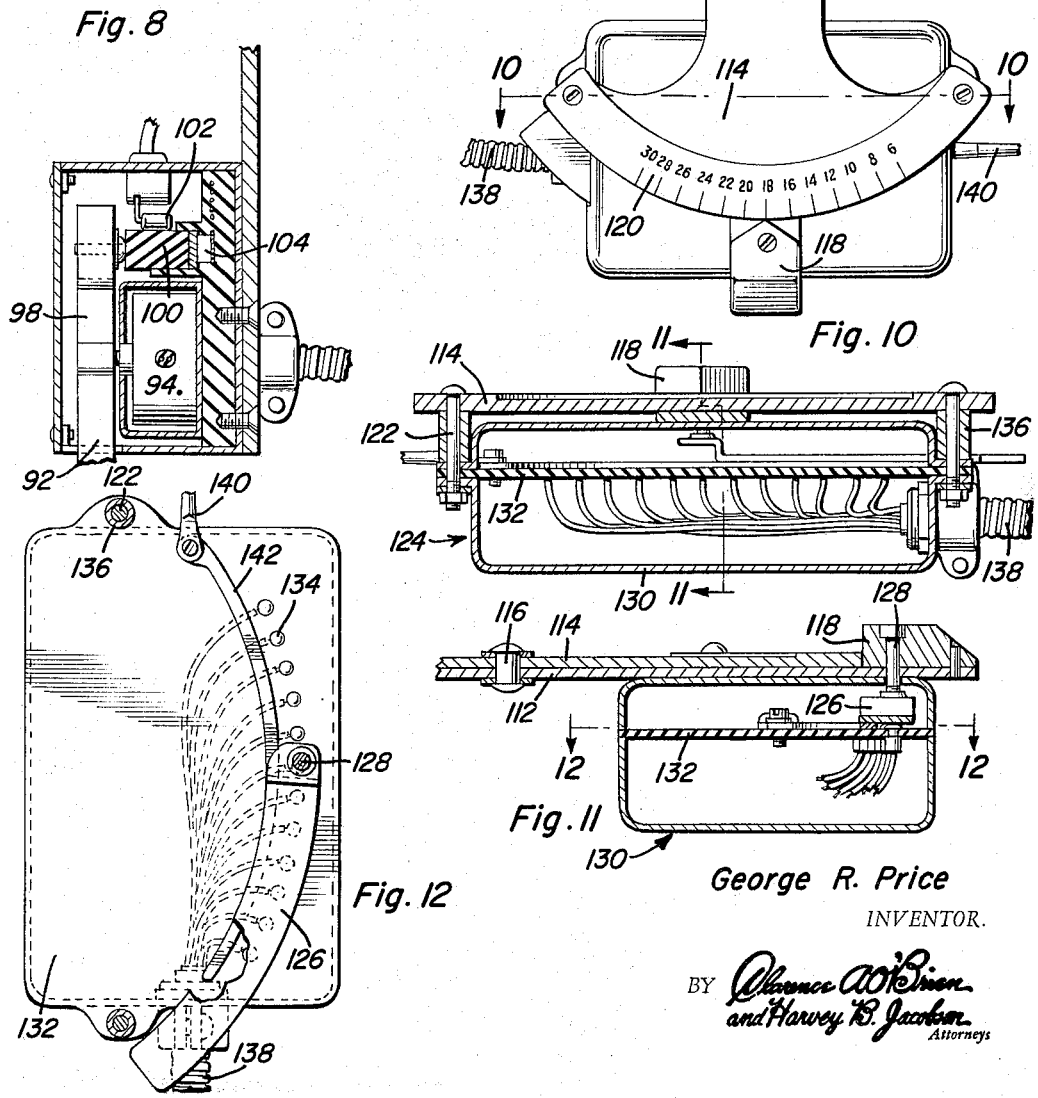

Nov. 29, 1966 G. R. PRICE 3,288,276
SAFETY DEVICE FOR TYPESETTING MACHINES
Filed Sept. 30, 1963 7 Sheets-Sheet 6

George R. Price
INVENTOR.

BY Clarence A. O'Brien
and Harvey B. Jacobson
Attorneys

Nov. 29, 1966  G. R. PRICE  3,288,276
SAFETY DEVICE FOR TYPESETTING MACHINES
Filed Sept. 30, 1963  7 Sheets-Sheet 7
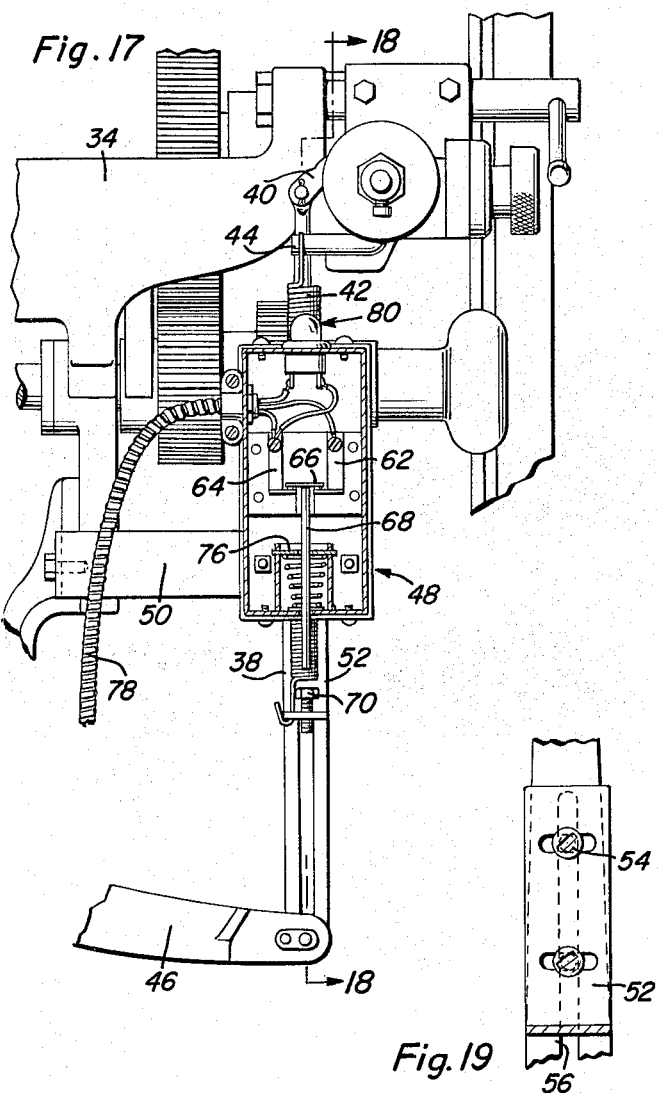
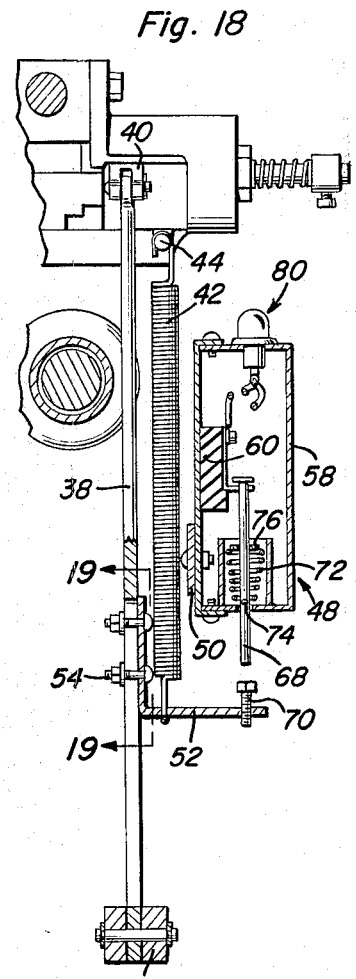
George R. Price
INVENTOR.

United States Patent Office 3,288,276
Patented Nov. 29, 1966

3,288,276
SAFETY DEVICE FOR TYPESETTING MACHINES
George R. Price, Houston, Tex., assignor to Safety Devices, Inc., Houston, Tex., a corporation of Texas
Filed Sept. 30, 1963, Ser. No. 312,530
16 Claims. (Cl. 199—52)

The present invention relates to a malfunction indicating and damage preventing system for type composing machines such as those manufactured by the Intertype Corporation and the Mergenthaler Linotype Company.

The system of the present invention has as its primary object, to prevent extensive damage to the typesetting machine, loss of time resulting therefrom, and injury to the operator.

An additional important object of the present invention is to prevent a common and costly error on the part of the machine operator resulting in damage to machine parts and costly delay. More particularly, the system of the present invention will prevent damage which results from the improper selection of the ejector blade size for the length of slug cast in the machine, which is predetermined by the mold liner. An oversize ejector blade striking the mold liner when attempting to eject the slug carried in the mold disk, causes serious damage to various parts of the machine including the front trimming knives, the back trimming knife, the ejector latch as well as the ejector blade itself and in addition to the disturbance of precision settings throughout the machine. In accordance with the present invention, a special mold liner is utilized through which the length of the mold cavity corresponding thereto may be measured by a measuring device mounted adjacent to te mold disk for such purpose. The mold liner so measured is then compared with the setting of the ejector blade selector associated with a special multi-position contact device by means of which a signal is dispatched should the preselected ejector blade fail to correspond in size with the mold liner. The dispatch of this signal will not only provide the operator with an indication of the error but will also prevent operation of the ejector mechanism in order to avoid the aforementioned damages.

Additional objects of the present invention include the detection of malfunction in various places including tight and loose lines resulting from improper assembling of the line of matrices either because of operator error or excessive wear of parts such as the star wheel in the line assembling block. The system also functions to detect poor lockup conditions between the mouthpiece of the casting crucible and the mold exposed to the line of matrices after it has been justified and clamped in the vise jaws of the vise frame. Thus, poor lockup is detected regardless of its cause whether it be due to faulty operation of the casting mechanism or a combination of causes including tight or loose lines.

Other objects of the present invention include the identification of the malfunction and effective interruption in the operation of the machine so that it may be readily and rapidly restored to an operating condition. A considerable advantage is thereby achieved since the system prevents injury to the operator from hot metal squirts, for example and also saves time by immediately indicating the source of trouble to be corrected.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an electrical circuit diagram illustrating the operative relationship between the various components of the system of the present invention.

FIGURE 4 is an enlarged partial front view of a portion of the machine with parts removed.

FIGURE 5 is an enlarged front elevational view shown in FIGURE 4 with the cover lid removed.

FIGURE 6 is a perspective view of the mold liner utilized in connection with the present invention.

FIGURE 7 is a side elevational view of a portion of the ejector mechanism associated with the type composing machine.

FIGURE 8 is a sectional view taken substantially through a plane indicated by section line 8—8 in FIGURE 5.

FIGURE 9 is an enlarged top plan view of a portion of the ejector blade selecting device modified in accordance with the system of the present invention.

FIGURE 10 is a sectional view taken substantially through a plane indicated by section line 10—10 in FIGURE 9.

FIGURE 11 is a sectional view taken substantially through a plane indicated by section line 11—11 in FIGURE 10.

FIGURE 12 is a sectional view taken substantially through a plane indicated by section line 12—12 in FIGURE 11.

FIGURE 17 is an enlarged elevational view of a portion of the machine illustrated in FIGURE 2 with parts shown in section.

FIGURE 18 is a sectional view taken substantially through a plane indicated by section line 18—18 of FIGURE 17.

FIGURE 19 is a partial sectional view taken substantially through a plane indicated by section line 19—19 in FIGURE 18.

FIGURE 21 is a partial sectional view taken substantially through a plane indicated by section line 21—21 in FIGURE 20.

Figure 1:
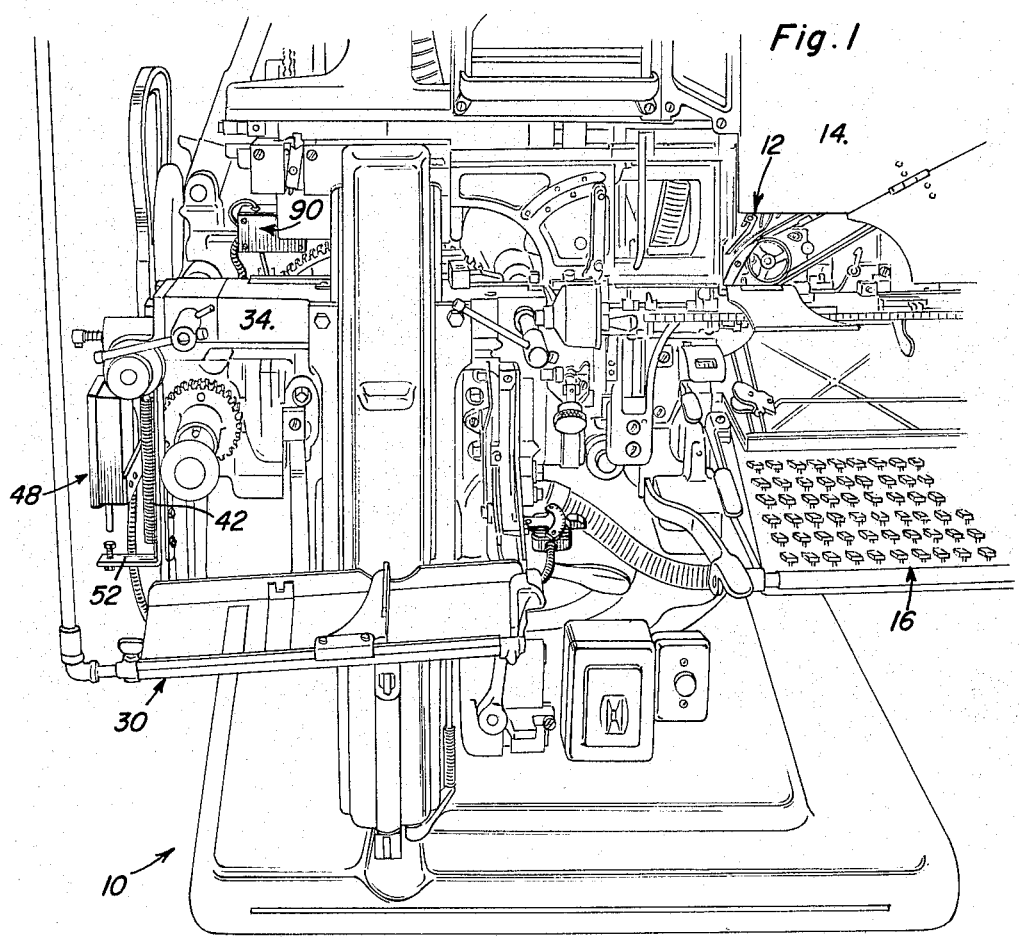
FIGURE 1 is a partial front perspective view of one form of type composing machine on which the system of the present invention is installed.
Figure 22:
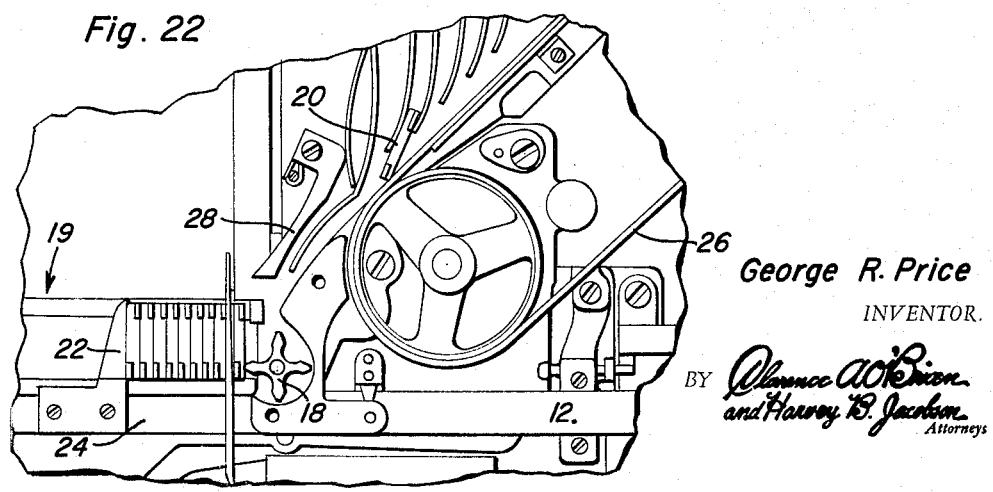
FIGURE 22 is an enlarged partial front elevational view of portions of the machine as illustrated in FIGURE 1 with parts removed.

Referring now to the drawings in detail, FIGURE 1 illustrates a type composing machine generally referred to by reference numeral 10 which for the purposes of the present description, is a machine model manufactured by the Intertype Corporation. As is well-known in the art, the machine 10 includes an assembling entrance portion 12 through which matrices and space bands selectively dispensed from the magazine 14 by operation of the keyboard 16, are transferred to an assembling elevator 18 as more clearly seen in FIGURE 22. Accordingly, the assembling block 12 includes the star wheel 18 by means of which each matrix 20 is pushed into a line up against a finger 22 projecting upwardly adjacent one end of the assembler slide 24 by means of which the operator may gauge the length of the line of matrices. It is at this point, that tight or loose lines may occur either because of error on the part of the operator or excessive wear of the star wheel 18 by means of which the matrices discharged by the assembler belt 26 past the chute finger 28 are pushed into line by the radial projections of the star wheel 18.

Figures 2, 20:
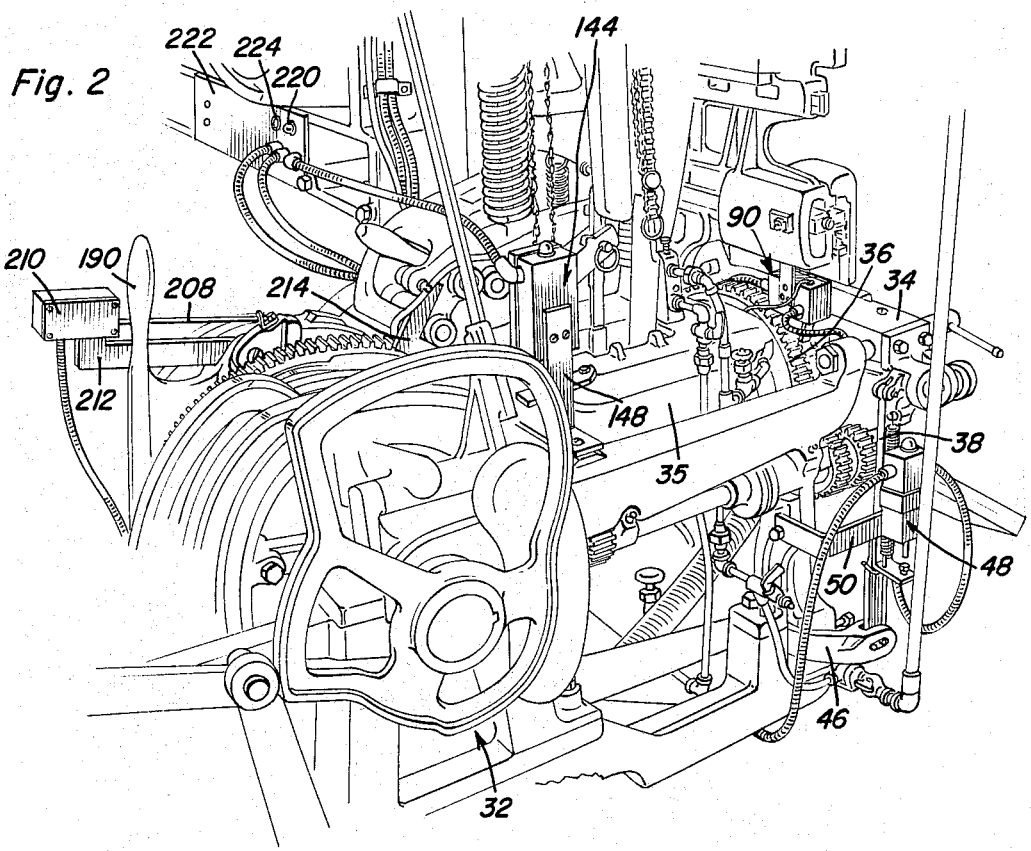
FIGURE 2 is a partial left side perspective view of the machine shown in FIGURE 1.
FIGURE 20 is an enlarged elevational view of a portion of the machine as illustrated in FIGURES 2 and 13.

As is well known, the line of matrices assembled in the assembling elevator 19 aforementioned, are transferred by lifting of the assembling elevator up to the level of the delivery carriage by means of which the line is then conveyed horizontally to the casting mechanism for alignment therewith constituting the initial step in an automatic cycle of operation delivering a cast slug into the galley tray 30 disposed in front of the machine as illustrated in FIGURE 1. With reference to FIGURE 2, it will be appreciated by those skilled in this art that the aforementioned automatic operation is achieved by drive of the cam assembly 32 rotatable about an axis disposed generally parallel to and rearwardly spaced from the left front side of the machine as viewed in FIGURE 1 at which location the vise frame 34 receives the line of matrices for justification purposes and in order to properly align the line of matrices with the mold carried on the mold disk 36 disposed rearwardly thereof and in front of the casting crucible 35 which in turn is disposed between the mold disk 36 and the cam assembly so that it may be displaced toward the mold disk for casting purposes.

When justification of the line of matrices is completed, the casting operation may begin. During the line justification procedure, tight or loose lines will be reflected by improper operation of the vise jaw closing rod 38 pivotally connected at its upper end to the vise closing lever 40 as more clearly seen in FIGURES 2, 17 and 18. The vise closing rod 38 is therefore biased upwardly by the spring 42 anchored to the frame at one end by the anchor projection 44 and connected to the vise closing rod at its lower end. The lower end of the vise closing rod 38 is pivotally connected to the cam lever 46 by means of which the rod is withdrawn downwardly against the bias of the spring 42 by the action of the cam assembly 32 as part of the line justifying procedure well-known in connection with machines of this type. The vise closing rod 38 will therefore move upwardly to a proper seating position in connection with the closing of the vise jaws associated therewith when a line of matrices of proper length is being handled. A tight line on the other hand, will prevent the vice closing rod 38 from moving to the proper seating position, this condition being detected by a vise closing switch device generally referred to by reference numeral 48. The switch device 48 is therefore fixedly mounted on the machine frame by the bracket 50 and thereby fixedly held generally parallel to the vise closing rod 38 so that it will be aligned with the horizontally projecting portion of the switch actuator member 52 secured to the rod 38 in a vertically adjusted position by means of a pair of fastener bolts 54 extending through a slot 56 formed in the rod 38 as more clearly seen in FIGURE 19. The switch device 48 is provided with a housing 58 within which there is mounted the contact bearing block 60 to which a pair of contacts 62 and 64 are secured normally bridged by the conductive contactor 66 connected to the top of the switch plunger 68 which projects downwardly from the housing 58 and is aligned with the vertically adjustable actuating stud 70 on the actuator bracket 52. The contactor 66 is normally held in contact with the contact elements 62 and 64 by means of the spring 72 reacting between the pin 74 secured to the switch plunger 68 and the fixed plate 76 through which the plunger 68 is slidable. It will therefore be apparent, that when the vise closing rod 38 is moved upwardly to its proper seating position, the actuating stud 70 on the actuator bracket 52 will engage the switch plunger 68 so as to displace it against the bias of spring 72 into a switch opening position. On the other hand, if the line being justified within the vise frame is too tight, the vise closing rod 38 will not be displaced by a sufficient amount so that the switch plunger 68 will not be upwardly displaced and the switch device 48 will remain closed. The contact elements 62 and 64 of the switch device are therefore connected to electrical conductors extending through the conduit 78, an electrical conductor also being carried therein for connection to the indicator lamp 80 mounted on top of the switch housing 58 by means of which the operator is informed of a bad line. It will also be observed, that the switch actuating bracket 52 anchors the lower end of the spring 42 so that by horizontally adjusting the position of the bracket 52, the switch device 48 may be rendered operative to detect loose lines.

The line of matrices are held in the vise frame in alignment with a cavity in the mold disk 36. As more clearly seen in FIGURE 4, the length of the slug to be cast in the mold disk is determined by the length of the mold liner 82 disposed between the upper surface of the mold body 84 and the mold cap 86 clamped thereto. The left end of the mold liner 82 as more clearly seen in FIGURE 6, is therefore provided with an extension or tab 88 bent at a 45° angle and having a length corresponding to the length of the liner body. In this manner, the length of the liner may be measured while in a horizontal casting position in order to determine the length of the slug to be subsequently cast. Toward this end, a measuring device generally referred to by reference numeral 90 is mounted by the machine frame in close adjacency to the upper left portion of the mold disk as shown in FIGURE 4 so that a downwardly extending measuring arm 92 may engage the extension 88. Measurement of the linear 82 is achieved by limiting movement of the measuring arm 92 to a position corresponding to the length that the tab 88 projects from the side of the mold body. As more clearly seen in FIGURE 5, movement is imparted to the measuring arm 88 by a rotary solenoid or motor 94 to which the electrical cable 96 is connected through which the solenoid 94 is energized. Connected to the measuring arm 88 for angular displacement therewith, is a contact moving arm 98 having a pin and slot connection to a contact slide element 100 and electrical connection is made with the contact slide 100 through the roller contact 102. The slide contact 100 also establishes electrical contact with a number of fixed contact elements 104, the number of contacts depending upon the amount of angular displacement imparted to the slide 100 by the measuring arm 88. It will therefore be apparent, that the number of fixed contacts 104 that are electrically connected to the roller contact 102 by the slide contact 100 will depend upon the position to which the measuring arm 88 is limited by the measuring tab 88 of the mold liner to thereby provide an electrical measurement of the slug length corresponding to the particular liner. The measuring device 90 may thereby compare the slug length thus measured with the side of the ejector blade which was previously selected.

Referring now to FIGURES 4, 7, 9, 10, 11 and 12, it will be apparent that the ejector mechanism 106 is disposed rearwardly of the mold disk in alignment therewith for ejecting a cast slug from the mold cavity by projection of an ejector blade therethrough as is well-known in the art. The size of the ejector blade must however be selected in accordance with the length of the slug cast inasmuch as oversize blades could not move through the mold cavity and will strike the liner and cause damage to various parts as aforementioned. Selection of the ejector blade is achieved by positioning of a selector rod 108 disposed below the ejector mechanism as shown in FIGURE 7, said rod 108 extending through a guide tube 110 and being pivotally connected at its forward end to a selector lever 112. The selector lever is therefore pivotally mounted below a fixed sector plate 114 by means of the pivot 116, said plate 114 being secured to the guide tube 110. An indicator knob 118 is therefore secured to the end of the selector lever 112 and cooperates with a scale 120 on the plate 114 so that the operator may make a selection of the size of the ejector blade as more clearly shown in FIGURE 9, the ejector blade sizes varying between 6 and 30 picas. Disposed below the plate 114 and secured thereto by fastener bolt assemblies 122, is a multipositioned contact device 124 by means of which the aforementioned mold liner measurement obtained by the measuring device 90 may be compared with the setting of the selector lever 112. Accordingly, an elongated arcuate contact member 126 is secured to the indicating knob 118 of the selector lever 112 by the fastener bolt 128, the fastener bolt 128 extending through an arcuate slot formed in the top of the housing 130 for such purpose. The housing is therefore formed from an upper and lower section clamped to intermediate non-conductive mounting board 132 on which a plurality of contacts 134 are mounted for engagement by the contact member 126. The housing assembly is supported by the bolt fasteners 122 and non-conductively spaced below the plate 114 by the spacers 136. Electrical conductors housed within the conduit 138 are connected to the contacts 134 while an electrical conductor 140 is connected to an arcuate conductive strip 142 mounted on the side of the non-conductive board 132 opposite the side to which the contacts 134 are connected to the wires housed in the cable 138. The conductive strip 142 is thereby disposed in constant electrical contact with the contact member 126 so as to establish electrical contact between the conductor 140 and a number of contacts 134 dependent upon the position of the selector lever 112. In this manner, the setting of the blades selector may be compared with the aforementioned measurement provided by the measuring device 90. As will be hereafter explained, a wrong selection of the ejector blade size will thereby be detected and operation of the machine interrupted so as to enable the operator to correct the blade selection, this being achieved by release of the ejecting mechanism through the locking lever 142 as shown in FIGURE 7 in order to permit a change in selection by manipulation of the blade selector lever 112.

Although the detecting switch device 48 will sense a condition by virtue of which poor lockup will be obtained when casting, other causes may also be responsible for it, a lockup detecting switch device 144 is therefore mounted adjacent to the casting crucible or pot 35 within which the molten metal is contained. As more clearly seen in FIGURES 13 and 14, the switch housing 146 associated with the detecting device 144 is fixedly mounted by the mounting bracket 148 adjacent the end of the casting crucible closest to the cam assembly 32. The switch housing 46 is therefore held just above the crucible so that when it is pivotally displaced by the pot lever associated therewith under the action of the cam assembly, into a proper lockup positon, the switch plunger 150 projecting downwardly from the switch housing 146 will be engaged by the vertically adjustable actuating stud 152 on a laterally projecting actuator element 154 secured to the end of the crucible 35 by the fastener 156. The switch plunger 150 is therefore urged downwardly by the biasing spring 158 within the switch housing so as to hold the contactor 160 in engagement with the spaced contact elements 162 and 164 mounted within the switch housing and electrically connected to conductors housed within the cable 166 extending from the switch housing. Also housed within the cable 166 are conductors electrically connected to an indicating lamp 168 mounted on the top of the housing 146 in order to indicate the existence of poor lockup. It will therefore be apparent, that under poor lockup conditions, the casting crucible will not be pivotally displaced by a sufficient amount as a result of which the switch plunger 150 is not engaged and the contactor 160 remains in electrical contact with the contact elements 162 and 164.

In order to stop the casting operation because of malfunction such as loose lines, existing machines are provided with a pump stop lever 170, pivotally mounted by the frame just below the cam follower lever 172 pivotally connected to the pump plunger 174 by means of which the molten metal is discharged under pressure through the mouthpiece of the casting crucible 35 in order to cast the slug in the mold cavity. The stop lever 170 is therefore provided with a stop projection 176 arranged upon displacement of the lever 170 to be received within the recess 178 of the cam lever 172 in order to prevent it from being displaced through the spring 180 in order to cast the slug. In accordance with the present invention, a bracket 182 secured to the stop lever 170 by the fastener 184 connecting the lever to the rod 186 extending from a line cancelling solenoid 188 fixedly mounted by the machine frame. Energization of the line cancelling solenoid 188 will thereby be effective to pull the lever 170 into its stop position in order to prevent casting.

Figure 13:
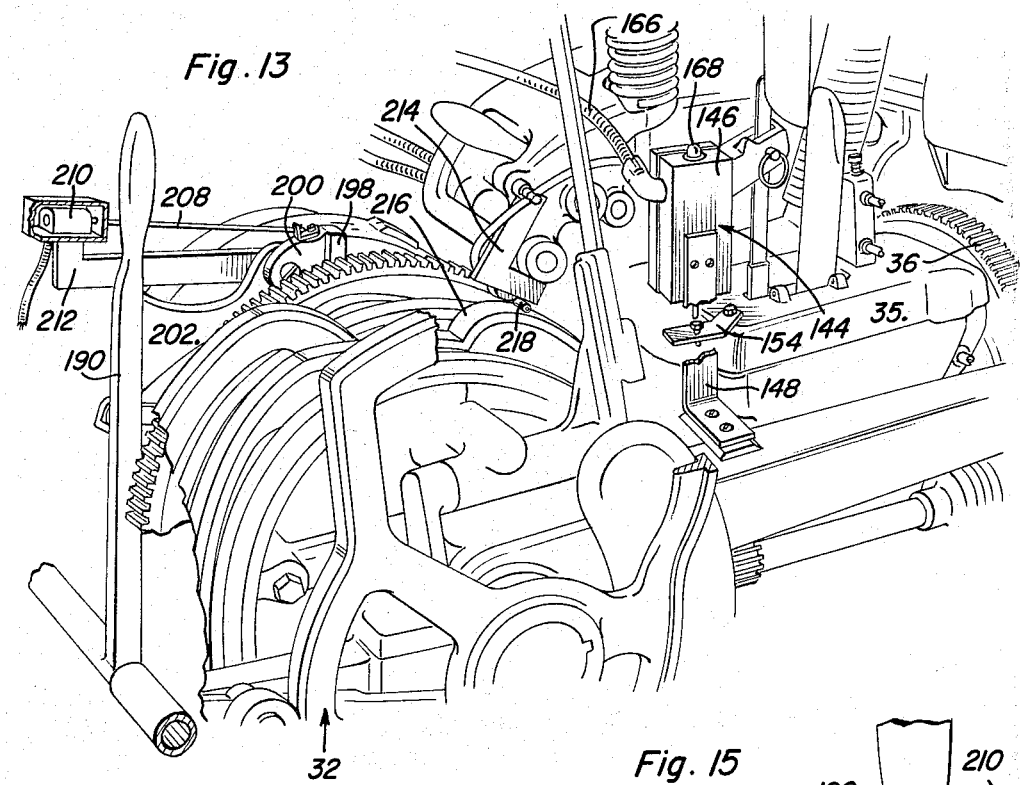
FIGURE 13 is a partial left side perspective view of the type composing machine with parts broken away and shown in section.
Figure 15:
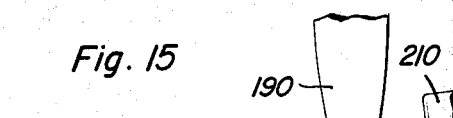
FIGURE 15 is an enlarged partial rear elevational view of a portion of the machine illustrated in FIGURE 13.
Figure 14:
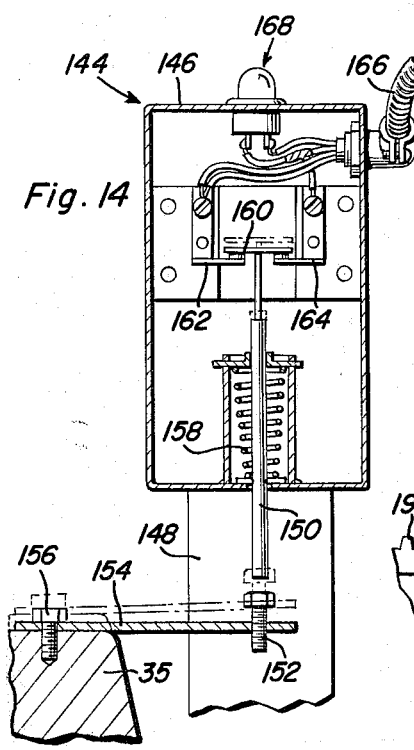
FIGURE 14 is an enlarged partial sectional view through the lockup switch mechanism shown in FIGURE 13.
Figure 16:
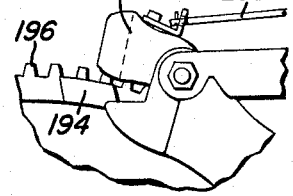
FIGURE 16 is a partial elevational view showing parts illustrated in FIGURE 15, in another operative condition.

Facilities are also provided to prevent operation of the slug ejector mechanism by disabling the drive connection thereto from the cam assembly 32. Referring therefore to FIGURES 13, 15 and 16, it will observed that the ejector lever 190 pivotally mounted by the frame and operatively connected to the ejector blade slide through the link member 192 is either manually actuated or automatically actuated in order to project an ejector blade through the mold cavity in order to displace a slug therefrom. Automatic operation of the ejector mechanism through the ejector lever 190 is ordinarily achieved by a laterally projecting cam slug 194 on the drive cam wheel 196 of the cam assembly 32, the cam lug 194 engaging the lateral projection 198 of a pivoted pawl member 200 carried by the pawl mounting portion 202 of the ejector lever 190. It will therefore be apparent, that the cam lug 194 will at the proper time in the automatic cycle of operations, engage the pawl 200 in order to angularly displace the ejector lever for operation of the ejector mechanism. In order to disable the drive to the ejector mechanism, the pawl 200 may be pivotally displaced to the position illustrated in FIGURE 16 so that the cam lug 194 will pass thereunder and not impart any displacement to the ejector lever. Toward this end, a bracket element 204 is secured to the pawl 200 by the fastener 206, the bracket 204 being connected to a rod 208 extending from an ejector solenoid 210 mounted by the arm 212 on the ejector lever.

Operation of the measuring device 90 and the functioning of the detecting switch devices 48 and 144 to sense malfunctioning, operator error or wear of parts, is restricted to the proper operational phase of the machine, namely just prior to casting by means of a cam-operated switch 214 fixedly mounted above the cam assembly for engagement by the pot lever actuating cam 216. The switch device 214 is therefore provided with a roller contact 218 as more clearly seen in FIGURE 13 arranged to sense a portion of the cam contour just prior to casting. When so actuated, the switch device 214 renders the measuring device 90 operative so that it may perform its function including disabling the drive connection to the ejector mechanism by energization of the ejector solenoid 210 should there be a blade selection error as well as to provide an indication thereof through the indicator lamp 220 mounted on a control panel 222 as illustrated in FIGURE 2. Also mounted on the control panel 222 is a reset button 224 by means of which the operative condition of the ejector mechanism may be restored by de-energization of the ejector solenoid 210. Therefore, the control panel will be wired to the measuring device 90 and the cam operated switch device 216 as well as to the switch detecting devices 48 and 144. Also wired to the control panel will be the line cancelling solenoid 188 operative through the pump stop lever 170 to stop casting.

Referring now to FIGURE 3, the operational relationship between the various components of the system will become apparent from the ensuing description wherein operation of the system will be reviewed. A source of electrical energy is connected to the control panel by the power lines 226 and 228 so as to establish a power circuit for energizing the line cancelling solenoid 188 and the ejector solenoid 210 in order to respectively stop the pot pump of the casting mechanism and disable the drive connection to the ejector mechanism. The solenoids 188 and 210 are therefore connected in parallel to the power line 228 while the circuit through the line cancelling solenoid to power line 226 is completed either upon closing of the relay switch 230 or 232. Energization of the ejector solenoid 210 on the other hand, is achieved upon closing of the power circuit thereto by closing of the relay switch 234 or simultaneous closing of the relay switches 232 and 236. The power line 226 is therefore connected to the relay switches 230, 232 and 234. The ejector solenoid 210 is connected by the line 238 to the relay switches 236 and 234 while line 240 connects the line cancelling solenoid 188 to the relay switches 230 and 232. The relay switches remain open to prevent operation of the line cancelling solenoid and ejector solenoid until the relay coils associated therewith are energized, energization of the relay coils occurring only upon closing of the cam switch 214 connected in series with the primary 242 of transformer 244 across the power lines 226 and 228. The transformer secondary 246 is connected by line 248 in parallel to relay coils 250, 252, 254 and 256. Relay coil 250 is connected by line 258 to the secondary circuit line 260 through the normally closed lockup switch 144 connected to line 260 by line 262. Accordingly, after closing of the cam switch 214, the existence of a poor lockup condition will be detected by the detector switch 144 remaining closed. At the same time, an energizing circuit will be established between the lines 248 and 260 for the indicator lamp 168 by means of line 264 to which the relay coil 256 is connected. The nature of the malfunction will thereby be identified to the operator. Also, energization of the relay coil 250 will close the relay switch 230 so as to establish a power circuit through the line cancelling solenoid 188 as aforementioned in order to prevent casting and avoid damage to the machine and injury to the operator.

The relay coil 252 is connected by line 266 across the secondary circuit lines 248 and 260 when the vise switch 48 remains closed, this occurring when a bad line is detected by the switch 48 as aforementioned. Also, the indicator lamp 80 associated with the detecting switch 48 will be energized with the relay coil 252 so as to indicate to the operator the source of malfunction. Energization of the relay coil 252 will therefore close the relay switch 232 and thereby also complete the power circuit to the line cancelling solenoid in order to prevent casting.

Should there be a wrong selection of the epector blade size, this will be detected only after closure of the cam switch 214 so as to establish current in the secondary circuit connected across the rotary solenoid 94. The measuring arm of the line measuring device 90 will thereby be displaced to its linear measuring position and if it does not correspond to the position occupied by the blade selector, an electrical connection will be established between the line 260 and the line 268 connected in parallel to the relay coils 254 and 256. Energizing circuits for the relay coils 254 and 256 will thereby be completed. Closing of the relay switches 234 and 236 will therefore be effected so as to establish a power circuit for the ejector solenoid and for the line cancelling colenoid 188 simultaneously therewith even if the relay switches 230 and 232 remain open. Upon energization of the relay coil 254, the holding relay switch 270 is also closed so as to establish a holding circuit for the relay coil 254 which is opened only upon actuation of the normally closed relay switch 224. The ejector solenoid 210 may thereby be maintained ener- gized for subsequently disabling the drive connection to the ejector mechanism. Also, at the same time, the indicator lamp 220 will be energized so as to indicate the cause of trouble. The relay energizing circuit may be opened after the correcting of the blade selector setting, by depression of the reset switch 224 in order to restore the machine to an operative condition.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a type comprising machine having an assembling mechanism for transferring a line of matrices to a vise mechanism wherein said line of matrices is justified when aligned with a mold including a linear predetermining the length of a slug, cast in the mold by a casting mechanism including a line cancelling stop and having an ejector mechanism including an ejector blade selector for ejecting said slug from the mold, when aligned therewith, by an ejector blade corresponding in size to said length of the slug, a malfunction indicating and damage preventing system including: means for measuring said length of the slug to be cast, comparing means operatively connecting said ejector blade selector with the measuring means for dispatching a signal when the length of slug to be cast does not correspond to the size of the ejector blade selected, means responsive to initial operation of the casting mechanism for rendering the measuring means operative to engage the liner prior to casting, detecting means rendered operative simultaneously with the measuring means for sensing malfunction of the casting mechanism and the assembling mechanism to independently stop casting, means responsive to dispatch of said signal from the comparing means for both preventing casting and subsequent operation of the ejector mechanism, indicating means operatively connected to said detecting means for identifying the malfunction, and reset means operatively connected to said signal responsive means for restoring the ejector mechanism to an operative condition.

2. In a type composing machine having an assembling mechanism for transferring a line of matrices to a vise mechanism wherein said line of matrices is justified when aligned with a mold including a liner predetermining the length of a slug, cast in the mold by a casting mechanism including a line cancelling stop and having an ejector mechanism including an ejector blade selector for ejecting said slug from the mold, when aligned therewith, by an ejector blade corresponding in size to said length of the slug, means for measuring said length of the slug, comparing means operatively connecting said ejector blade selector with the measuring means for dispatching a signal when the length of slug does not correspond to the size of the ejector blade selected, means responsive to initial operation of the casting mechanism for rendering the measuring means operative, detecting means rendered operative simultaneously with the measuring means for sensing malfunction of the casting mechanism and the assembling mechanism to independently stop casting, means responsive to dispatch of said signal from the comparing means for both preventing casting and subsequent operation of the ejector mechanism, indicating means operatively connected to said detecting means for identifying the malfunction, and reset means operatively connected to said signal responsive means for restoring the ejector mechanism to an operative condition, said detecting means comprising, a pair of normally closed switch devices operatively positioned adjacent said casting mechanism and said vise mechanism for respective opening thereof in response to proper lockup with and justification of said line of matrices and relay means connected to said switch device for energization when closed to stop casting through said line cancelling stop.

3. The combination of claim 2 wherein said signal responsive means includes signal relay means energized in response to dispatch of said signal through the comparing means, drive disabling means operatively connected to the signal relay means for preventing operation of the ejector mechanism when energized, and holding relay means operatively connected to the signal relay means for holding the drive disabling means energized until the reset means is actuated.

4. The combination of claim 2 wherein the measuring means comprises, a measuring arm, motor means energized by said initial operation responsive means for displacing said arm into engagement with said liner, the liner having an extension for limiting movement of the measuring arm to a position corresponding to the slug length predetermined by the liner, and electrical contact means operatively connected to the measuring arm for measuring the displacement of said arm.

5. The combination of claim 2 wherein said comparing means comprises, multi-position contact means operatively connected to the ejector blade selector for identifying the blade size, and electrical connecting means operatively connecting the multi-position contact means with the measuring means for completing an energizing circuit through which said signal is dispatched.

6. The combination of claim 5 wherein said signal responsive means includes signal relay means energized in response to dispatch of said signal through the comparing means, drive disabling means operatively connected to the signal relay means for preventing operation of the ejector mechanism when energized, and holding relay means operatively connected to the signal relay means for holding the drive disabling means energized until the reset means is actuated.

7. The combination of claim 6 wherein said initial operation responsive means comprises, power circuit means operatively connected to the drive disabling means through the detecting means and the signal responsive means, a transformer rendered operative for supplying operating current to the detecting means and the signal responsive means, and cam-operated switch means for connecting said transformer to the power circuit means.

8. In a type composing machine having an assembling mechanism for transferring a line of matrices to a vise mechanism wherein said line of matrices is justified when aligned with a mold including a liner predetermining the length of a slug, cast in the mold by a casting mechanism including a line cancelling stop and having an ejector mechanism including an ejector blade selector for ejecting said slug from the mold, when aligned therewith, by an ejector blade corresponding in size to said length of the slug, means for measuring said length of the slug, comparing means operatively connecting said ejector blade selector with the measuring means for dispatching a signal when the length of slug does not correspond to the size of the ejector blade selected, means responsive to initial operation of the casting mechanism for rendering the measuring means operative, detecting means rendered operative simultaneously with the measuring means for sensing malfunction of the casting mechanism and the assembling mechanism to independently stop casting, means responsive to dispatch of said signal from the comparing means for both preventing casting and subsequent operation of the ejector mechanism, indicating means operatively connected to said detecting means for identifying the malfunction, and reset means operatively connected to said signal responsive means for restoring the ejector mechanism to an operative condition, said signal responsive means including signal relay means energized in response to dispatch of said signal through the comparing means, drive disabling means operatively connected to the signal relay means for preventing operation of the ejector mechanism when energized, and holding relay means operatively connected to the signal relay means for holding the drive disabling means energized until the reset means is actuated.

9. The combination of claim 8 wherein said initial operation responsive means comprises, power circuit means operatively connected to the drive disabling means through the detecting means and the signal responsive means, a transformer rendered operative for supplying operating current to the detecting means and the signal responsive means, and cam-operated switch means for connecting said transformer to the power circuit means.

10. In a type composing machine having an indexed mold mounting a liner predetermining the length of a slug to be cast in the mold and on ejector mechanism including an ejector blade selector for ejecting said slug from the mold with an ejector blade corresponding in size to said length of the slug, a damage preventing system including; measuring means displaceable into engagement with the liner prior to casting for sensing the length of the slug to be cast, comparing means operatively connecting said ejector blade selector with the measuring means for dispatching a signal when the length of the slug to be cast does not correspond to the size of the ejector blade selected, and means for disabling operation of the ejector mechanism in response to said signal dispatched from the comparing means, said comparing means comprising, multi-position contact means operatively connected to the ejector blade selector for identifying the blade size, and electrical connecting means operatively connecting the multi-position contact means with the measuring means for completing an energizing circuit through which said signal is dispatched.

11. The combination of claim 10 wherein the measuring means comprises, a measuring arm, motor means energized for displacing said arm into engagement with said liner, the liner having an extension for limiting movement of the measuring arm to a position corresponding to the slug length predetermined by the liner, and electrical contact means operatively connected to the measuring arm for measuring the displacement of said arm.

12. In a type composing machine having an indexed mold mounting a liner predetermining the length of a slug to be cast in the mold by a casting mechanism and an ejector mechanism including an ejector blade selector for ejecting said slug from the mold with an ejector blade corresponding in size to said length of the slug, a damage preventing system including; measuring means displaceable into engagement with a liner prior to casting for sensing the length of the slug to be cast, means responsive to initial operation of the casting mechanism for rendering the measuring means operative to engage the liner, comparing means operatively connecting said ejector blade selector with the measuring means for dispatching a signal when a length of the slug to be cast does not correspond to the size of the ejector blade selected, and means for disabling operation of the ejector mechanism in response to said signal dispatched from the comparing means, said initial operation responsive means comprising, power circuit means operatively connected to the disabling means, a transformer rendered operative for supplying operating current to the measuring means and the signal responsive means, and cam-operated switch means for connecting said transformer to the power circuit means.

13. In a type composing machine having a mold liner predetermining the length of a slug cast by a casting mechanism, and an ejector mechanism including a blade selector through which the slug is ejected by a blade corresponding in size to the length of the slug; a malfunction indicating and damage preventing system including; means for measuring said length of the slug, comparing means operatively connecting said ejector blade selector with the measuring means for dispatching a signal when the length of slug does not correspond to the size of the ejector blade selected, means responsive to initial operation of the casting mechanism for rendering the measuring means operative, detecting means rendered operative simultaneously with the measuring means for sensing other malfunctions of the machine, means responsive to dispatch of said signal from the comparing means for both preventing casting and subsequent operation of the ejector mechanism, and indicating means operatively connected to said detecting means for identifying the malfunction, and reset means operatively connected to said signal responsive means for restoring the ejector mechanism to an operative condition.

14. The combination of claim 17 wherein said machine includes an assembling mechanism for transferring a line of matrices assembled therein to a vise mechanism for alignment with the casting mechanism, said detecting means including; means operatively engageable by the vise mechanism for gauging lines of matrices when aligned with the casting mechanism to sense improper assemblage thereof in the assembling mechanism, means responsive to said initial operation of the casting mechanism for rendering the detecting means operative to dispatch a second signal when sensing improper assemblage of a line of matrices, and means responsive to the dispatch of said second signal for stopping operation of the casting mechanism and rendering the indicating means operative to identify the malfunction.

15. In a type composing machine having an indexed mold mounting a liner predetermining the length of a slug to be cast in the mold by a casting mechanism, and an ejector mechanism including an ejector blade selector for ejecting said slug from the mold with an ejector blade corresponding in size to said length of the slug, a damage preventing system including; measuring means displaceable into engagement with the liner prior to casting for sensing the length of the slug to be cast, means responsive to initial operation of the casting mechanism for rendering the measuring means operative to engage the liner, comparing means operatively connecting said ejector blade selector with the measuring means for dispatching a signal when the length of the slug to be cast does not correspond to the size of the ejector blade selected, and means for disabling operation of the ejector mechanism in response to said signal dispatched from the comparing means.

16. In combination with a mold carrier of a type composing machine having drive means for indexing the mold carrier between a casting position and an ejection position and operating a casting mechanism and an ejecting mechanism, said mold carrier mounting a liner in a slug forming cavity predetermining the size of a slug, and a selector device connected to the ejection mechanism for conditioning the same when disconnected from the drive means to eject a slug of a preselected size from said cavity, measuring means displaceable into engagement with the liner for measuring the size of the slug to be cast, means mounting said measuring means for engagement thereof with the liner only in the casting position of the mold carrier, means operatively connecting said measuring means to the selector device producing a signal in response to conditioning of the ejection mechanism for ejection of a slug different in size from the slug predetermined by the liner, and disabling means responsive to said signal for interrupting operation of the casting mechanism and disconnecting the drive means from the ejection mechanism prior to casting of the slug, whereby the selector device may be operated to correct the selection error before any slug is cast.

References Cited by the Examiner
UNITED STATES PATENTS

| | | | |
|---|---|---|---|
| 1,157,786 | 10/1915 | Kennedy | 199—52 |
| 1,163,985 | 12/1915 | Drewell | 199—52 X |
| 1,282,556 | 10/1918 | Fadum | 199—52 |
| 1,405,498 | 2/1922 | Cranny | 199—60 |
| 1,475,007 | 11/1923 | Fadum | 199—52 |
| 2,005,796 | 6/1935 | Mills | 199—52 |
| 2,057,420 | 10/1936 | Dent | 199—52 |
| 2,264,798 | 12/1941 | Hilpman | 199—52 |
| 2,625,259 | 1/1953 | Turner | 199—13 X |
| 2,626,044 | 1/1953 | Barnes | 199—58 |
| 2,793,730 | 5/1957 | Magnat | 199—52 X |
| 2,874,825 | 2/1959 | Rossetto | 199—52 X |
| 2,955,703 | 10/1960 | Shaffstall | 199—52 X |

ROBERT E. PULFREY, *Primary Examiner.*

E. S. BURR, *Assistant Examiner.*